United States Patent
Kuck et al.

(10) Patent No.: US 7,325,233 B2
(45) Date of Patent: Jan. 29, 2008

(54) PROCESS ATTACHABLE VIRTUAL MACHINES

(75) Inventors: Norbert Kuck, Karlsruhe (DE); Harald Kuck, Heidelberg (DE); Edgar Lott, Nussloch (DE); Hans-Christoph Rohland, St. Leon-Rot (DE); Oliver Schmidt, Wörth am Rhein (DE)

(73) Assignee: SAP AG, Walldorf (DE)

( * ) Notice: Subject to any disclaimer, the term of this patent is extended or adjusted under 35 U.S.C. 154(b) by 654 days.

(21) Appl. No.: 10/290,087

(22) Filed: Nov. 7, 2002

(65) Prior Publication Data

US 2003/0088604 A1    May 8, 2003

Related U.S. Application Data

(60) Provisional application No. 60/400,491, filed on Aug. 1, 2002, provisional application No. 60/348,068, filed on Nov. 7, 2001.

(51) Int. Cl.
*G06F 9/46* (2006.01)

(52) U.S. Cl. .................. 718/103; 718/100; 718/102; 718/1; 709/201; 709/203

(58) Field of Classification Search .................. 718/1, 718/100, 102–104, 107–108; 709/201, 203, 709/227
See application file for complete search history.

(56) References Cited

U.S. PATENT DOCUMENTS

| | | | |
|---|---|---|---|
| 5,555,385 A | 9/1996 | Osisek | |
| 6,223,202 B1* | 4/2001 | Bayeh | 718/102 |
| 6,330,709 B1* | 12/2001 | Johnson et al. | 717/100 |
| 6,401,109 B1* | 6/2002 | Heiney et al. | 718/1 |
| 6,519,594 B1* | 2/2003 | Li | 707/10 |
| 6,542,845 B1* | 4/2003 | Grucci et al. | 702/122 |
| 6,732,220 B2* | 5/2004 | Babaian et al. | 711/6 |
| 6,854,114 B1* | 2/2005 | Sexton et al. | 718/1 |

FOREIGN PATENT DOCUMENTS

| | | |
|---|---|---|
| EP | 0 362 105 A2 | 4/1990 |
| EP | 0 473 913 A2 | 3/1992 |
| EP | 0 478 338 A2 | 4/1992 |
| WO | WO 00/52572 | 9/2000 |

OTHER PUBLICATIONS

Kuck et al., "SAP VM Container: Using Process Attachable Virtual Machines to Provide Isolation and Scalability for Large Servers" (Aug. 2002).*

(Continued)

*Primary Examiner*—Meng-Al T. An
*Assistant Examiner*—Lilian Vo
(74) *Attorney, Agent, or Firm*—Blakely, Sokoloff, Taylor & Zafman LLP

(57) ABSTRACT

Methods and apparatus, including computer program products, for using process attachable virtual machines to provide isolation between user sessions in a scalable manner, enabling a server to robustly process requests corresponding to a large number of user sessions. The methods and apparatus include initializing a process attachable virtual machine for a user session, receiving a request corresponding to the user session, and binding the process attachable virtual machine to an operating system process to process the request.

16 Claims, 5 Drawing Sheets

OTHER PUBLICATIONS

Kuck et al., "SAP J2EE Server for Mission Critical Applications—Proposal" (Oct. 2001).*

Czajkowski et al., "A Multi-User Virtual Machine," USENIX Annual Technical Conference (Jun. 2003).*

"Java Native Interface Specification", INTERNET, 'Online!, May 16, 1997, XP002201722, USA, http://sunsite.kth.se/misc/javacorner/sunsites/jdk1.1docs/jni.pdf.

Austin, Pawlan, "Advanced Programming for the Java 2 Platform—Chapter 5 Continued: Other Programming Issues", 'Online!, Nov. 30, 1999, Sun Microsystems, Inc. http://developer.java.sun.com/developer/onlineTraining/Programming/JDCBook/jniref.html.

Google: Google-Suche:define:Binding. Definition von Binding in Web in Elglisch. Retreived from the Internet: google.de/search?q=define:Binding&hl=de&lr=&defl=en, pp. 1-3, Retrieved on Jul. 21, 2005.

Binding (computer science)-Wikipedia, the free encyclopedia. Retreived from the Internet: http://en.wikipedia.org/wiki/Binding_(computer_science), p. 1. Retrieved on Jul. 21, 2005.

Name binding—Wikipedia, the free encyclopedia. Retreived from the Internet: en.wikipedia.org/wiki/Name_binding, pp. 1-2. Retrieved on Jul. 21, 2005.

Kuck et al., "SAP VM Container: Using Process Attachable Virtual Machines to Provide Isolation and Scalability for Large Servers", published on Aug. 2, 2006, retrieved from bitser.net/isolate-interest/papers/PAVM.pdf, XP001208545.

Work-in-Progress Reports (WiPs) List of Presentations of 2nd Java Virtual Machine Research and Technology Symposium, held on 1. and Aug. 2, 2006, retrieved from usenix.org/events/javavm02/wipslist.html.

Parnas D: "SAP Virtual Machine Container (as seen on TechEd)", Blog, Posted on Oct. 23, 2004. Retrieved from sdm.sap.com/irj/sdn/weblogs?blog=/pub/wlg/940.

* cited by examiner

PROCESS ATTACHABLE VIRTUAL MACHINES

CROSS-REFERENCE TO RELATED APPLICATIONS

This application claims priority to U.S. Provisional Application No. 60/348,068, entitled JAVA SERVER HAVING SHARED MEMORY, filed Nov. 7, 2001, and to U.S. Provisional Application No. 60/400,491, entitled PROVIDING ISOLATION AND SCALABILITY FOR LARGE SERVERS THROUGH PROCESS-ATTACHABLE VIRTUAL MACHINES, filed Aug. 1, 2002. The disclosures of the above applications are incorporated herein by reference in their entirety.

BACKGROUND

The present application relates to data processing by digital computers, and more particularly to server virtual machines.

Some servers, such as enterprise servers or other large servers, can generally be characterized as request processing engines, serving large numbers of typically small user requests that belong to user sessions. The actual request processing involves running user code, such as Java servlets or Enterprise Java Beans (EJBs), in a virtual machine (VM) executing on a server. Scalability in such a server is traditionally achieved through the use of thread, i.e., a multithreaded VM is used to process requests corresponding to a number of user sessions. However, system robustness requires strong isolation between user sessions, something that is often hard to achieve if a large number of user sessions are running within a single VM.

Operating systems can provide nearly perfect isolation for processes. In some operating systems, a crashed process will not affect other processes, and will not leak or leave behind allocated resources. It is conceptually possible to isolate user sessions and thus increase the robustness of a server by allocating one operating system (OS) process for each user session, and running a VM for that user session within the allocated process. Such an approach is not feasible, however, due to the OS scheduling overhead that would be incurred in switching between a large number of processes, and also due to the resources that such an approach would consume. OS processes are not designed to model entities as fine-grained as user sessions.

SUMMARY

The present invention provides methods and apparatus, including computer program products, that can be used to provide isolation between user sessions in a scalable manner, thereby enabling a server to robustly process requests corresponding to a large number of user sessions. Each user session is provided with its own VM, which is executed within an operating system process. A pool of processes can be allocated to a server. When the server receives a request, it can attach the VM of the corresponding user session to one of the available processes, which can then execute the VM to process the request. After the request has been processed, the server can detach the VM from the process. The process can then be attached to the VM of a different user session to process a different request. A process attachable virtual machine (PAVM) is a VM that can be attached to and detached from an OS process. PAVMs can be implemented by storing the states of the virtual machines in shared memory that is accessible to the processes in a server pool. Using shared memory enables PAVMs to be attached to and detached from processes at a low cost.

In one aspect, the invention features methods and apparatus, including computer program products, that include initializing a process attachable virtual machine for a user session, receiving a request corresponding to the user session, and binding the virtual machine to an operating system process to process the request.

The invention can be implemented to include one or more of the following advantageous features. The virtual machine can be detached from the operating system process upon completion of the processing of the request. Initializing can include storing the virtual machine in a memory area, and copying a template image into the memory area. Binding can include mapping a portion of the memory area into an address space of the operating system.

Storing can include maintaining a computational state of the virtual machine, including a heap and a stack of the virtual machine, in the memory area. Binding can include mapping a portion of the memory area, including the computation state of the virtual machine, into an address space of the operating system.

Storing can also include maintaining a user context, including a user heap and a user stack, in the memory area. The user context can include a handle to an input/output resource such as a file. The user context can also include a handle to a proxy for an input/output resource. The input/output resource can be a socket, and the proxy can be a socket manager.

The virtual machine can include instructions that are operable to cause a programmable processor to execute a first co-routine to simulate the execution of a first thread in the virtual machine, and to execute a second co-routine to simulate the execution of a second thread in the virtual machine. The first co-routine and the second co-routine can yield cooperatively to a thread scheduler upon entering a wait state. The virtual machine can also include instructions operable to cause a programmable processor to execute a synchronous function call to simulate the execution of an internal thread in the virtual machine. The internal thread that is simulated can be used to perform garbage collection.

In another aspect, the invention features methods and apparatus, including computer program products, that include initializing a process attachable virtual machine for a user session, receiving a request corresponding to the user session, selecting a process from a plurality of operating system processes, and binding the virtual machine to the selected process to process the request.

The invention can be implemented to include one or more of the following advantageous features. The virtual machine can be detached from the selected process upon completion of the processing of the request. Initializing can include storing the virtual machine in a memory area. The memory area can be a shared memory area that is accessible by each of the plurality of operating system processes. Binding can include mapping a portion of the shared memory area into an address space of the selected process.

Each process in the plurality of operating system processes can be isolated from the other processes in the plurality of operating system processes. The number of operating system processes in the plurality of operating system processes can be substantially equivalent to a predetermined number of processors in a computer on which the invention is executing or being used.

The invention can also include designating one of the plurality of operating system processes as a low priority process, and using the low priority process to perform an asynchronous function related to the virtual machine. The asynchronous function can be garbage collection.

In another aspect, the invention features methods and apparatus, including computer program products, that include initializing a process attachable virtual machine for a first user session, binding the virtual machine to an operating system process to process one or more requests corresponding to the first user session, and, upon termination of the first user session, using the virtual machine to process one or more requests corresponding to a second user session.

In another aspect, the invention features methods and apparatus, including computer program products, that include initializing a first process attachable virtual machine for a first user session, and initializing a second process attachable virtual machine for a second user session. The first virtual machine is bound to a first operating system process to process one or more requests corresponding to the first user session, and the second virtual machine is bound to a second operating system process to process one or more requests corresponding to the second user session. Type information of a class used by both the first virtual machine and the second virtual machine is stored in a shared memory area that is accessible by both the first operating system process and the second operating system process.

The invention can be implemented to realize one or more of the following advantages. PAVMs can provide strong isolation between user sessions in a highly scalable manner. Each user session can be provided with its own PAVM. A small pool of OS processes can be used to process user requests. Requests can be dispatched to one of the available processes, which can attach the appropriate PAVM in order to process each request. Storing the PAVMs in shared memory enables the PAVMs to be attached to and detached from processes at a low cost.

User sessions can have protected memory and can be fully isolated from each other. This can be achieved by mapping only the shared memory for a single PAVM at a time into a process. A crashed process may invalidate only its current session, and the process can easily be restarted. Standard debugging and profiling tools can easily be used on a per-session basis.

Co-routines can be used to easily store the stack of a PAVM, including the user stack, in shared memory. PAVMs do not need to be modified, or even made aware that their stack is in fact stored in shared memory. All global and static variables can be encapsulated in one data structure, and the entire heap can be redirected to shared memory.

Storing the context of a user session, as well as the heap and stack of a PAVM, in shared memory essentially makes the operation of binding or attaching the PAVM to an OS process a non-operation—the process simply has to map the appropriate section of shared memory into its address space. Data does not need to be actually moved or copied. Shared OS resources such as I/O resources can be implemented using descriptor passing between processes. For Java VMs, that only requires a few modifications to be made in a non-Java part of a class library. Alternatively, the task of managing OS resources can be delegated to a resource manager. Attaching PAVMs to and detaching PAVMs from processes can thus be carried out in a cost-effective manner. Consequently, a small number of processes can be used to efficiently process requests from a large number of user sessions.

PAVMs combine the advantages of threads and processes, while avoiding many of their respective drawbacks. Use of a limited pool of processes ensures good processor usage for Symmetric Multiprocessing (SMP) systems. Operating system co-routines can be used to simulate VM threads (sometimes referred to as providing "green threads" functionality). User-level scheduling of co-routines can provide control in optimizing fairness versus throughput. Although non-preemptive, co-routine scheduling can be used to maximize throughput request, especially if a batch processing strategy is used. In a batch processing strategy, each PAVM co-routine yields cooperatively to a thread scheduler when entering a wait state. Contention can be limited to user session scope, even for system activities like garbage collection.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
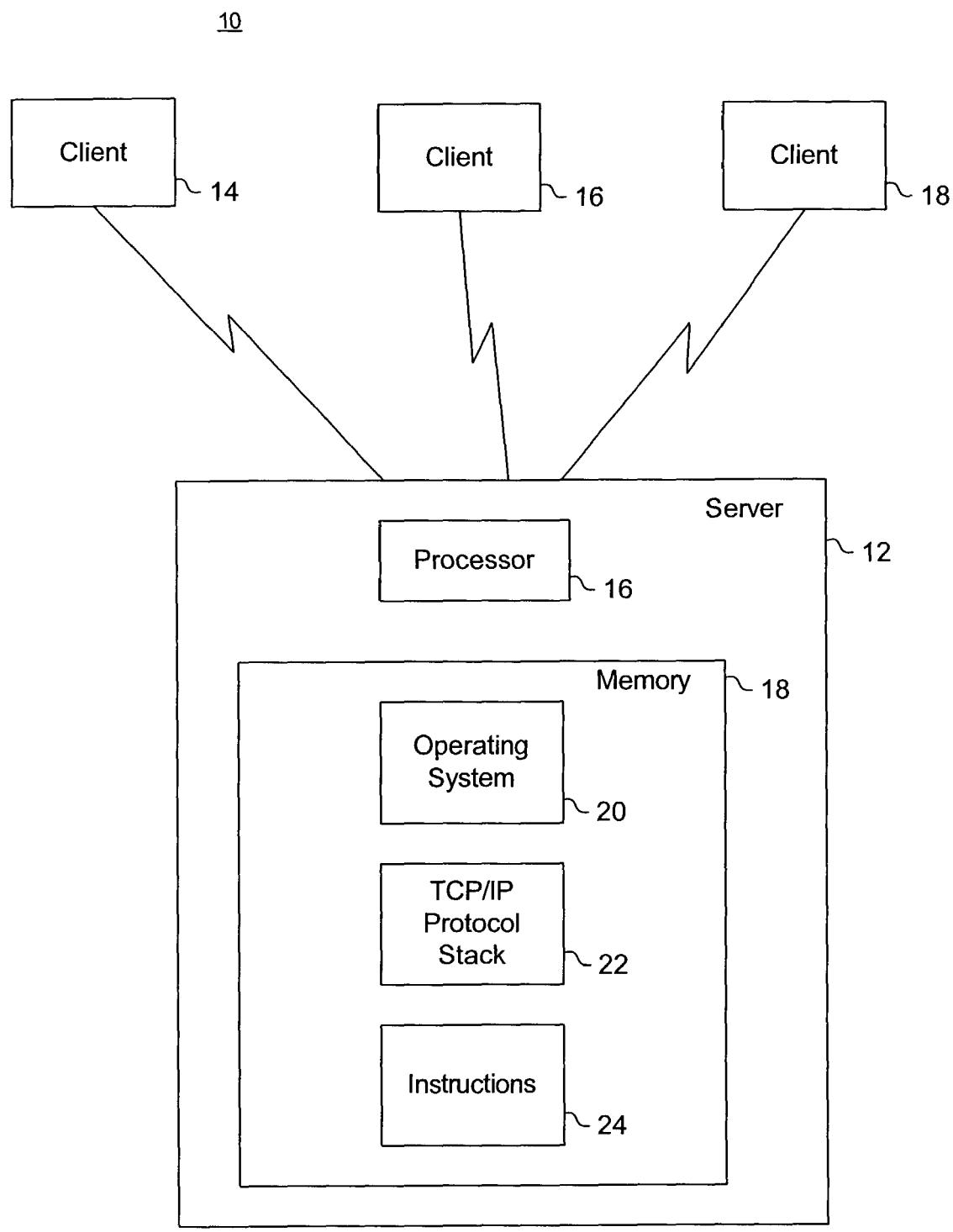
FIG. 1 is a block diagram of a client/server network.

Referring to FIG. 1, a network 10 includes a server 12 linked to client systems 14, 16, 18. The server 12 is a programmable data processing system suitable for implementing apparatus or performing methods in accordance with the invention. The server 12 contains a processor 16 and a memory 18. Memory 18 stores an operating system (OS) 20, a Transmission Control Protocol/Internet Protocol (TCP/IP) stack 22 for communicating over the network 10, and machine-executable instructions 24 executed by processor 16 to perform a process 500 below. In some implementations, the server 12 can contain multiple processors, each of which can be used to execute the machine-executable instructions 24.

Client systems 14, 16, 18 can execute multiple applications or application interfaces. Each instance of an application or an application interface can constitute a user session. Each user session can generate one or more requests to be processed by the server 12. The requests can include instructions to be executed on a virtual machine running on the server 12.

A virtual machine (VM) is an abstract machine that can include an instruction set, a set of registers, a stack, a heap, and a method area, like a real machine or processor. A VM essentially acts as an interface between program code and the actual processor or hardware platform on which the program code is to be executed. The program code includes instructions from the VM instruction set that manipulates the resources of the VM. The VM executes instructions on the processor or hardware platform on which the VM is running, and manipulates the resources of that processor or hardware platform, so as to effect the instructions of the program code. In this way, the same program code can be executed on multiple processors or hardware platforms without having to be rewritten or re-compiled for each processor or hardware platform. Instead, a VM is implemented for each processor or hardware platform, and the same program code can be executed in each VM. The implementation of a VM can be in code that is recognized by the processor or hardware platform. Alternatively, the implementation of a VM can be in code that is built directly into a processor.

As an example, a Java source program can be compiled into program code known as bytecode. The bytecode can then be executed on a Java VM running on any processor or platform. The Java VM can either interpret the bytecode one instruction at a time, or the bytecode can be further compiled for the real processor or platform using a just-in-time (JIT) compiler.

In order to isolate user sessions from each other and thereby increase the robustness of the server 12, each user session is provided with its own VM. More specifically, each user session is provided with its own process attachable virtual machine (PAVM), which is a VM that can be attached to and detached from an OS process. Each PAVM is stored in memory 18 of the server 12.

Figure 2:
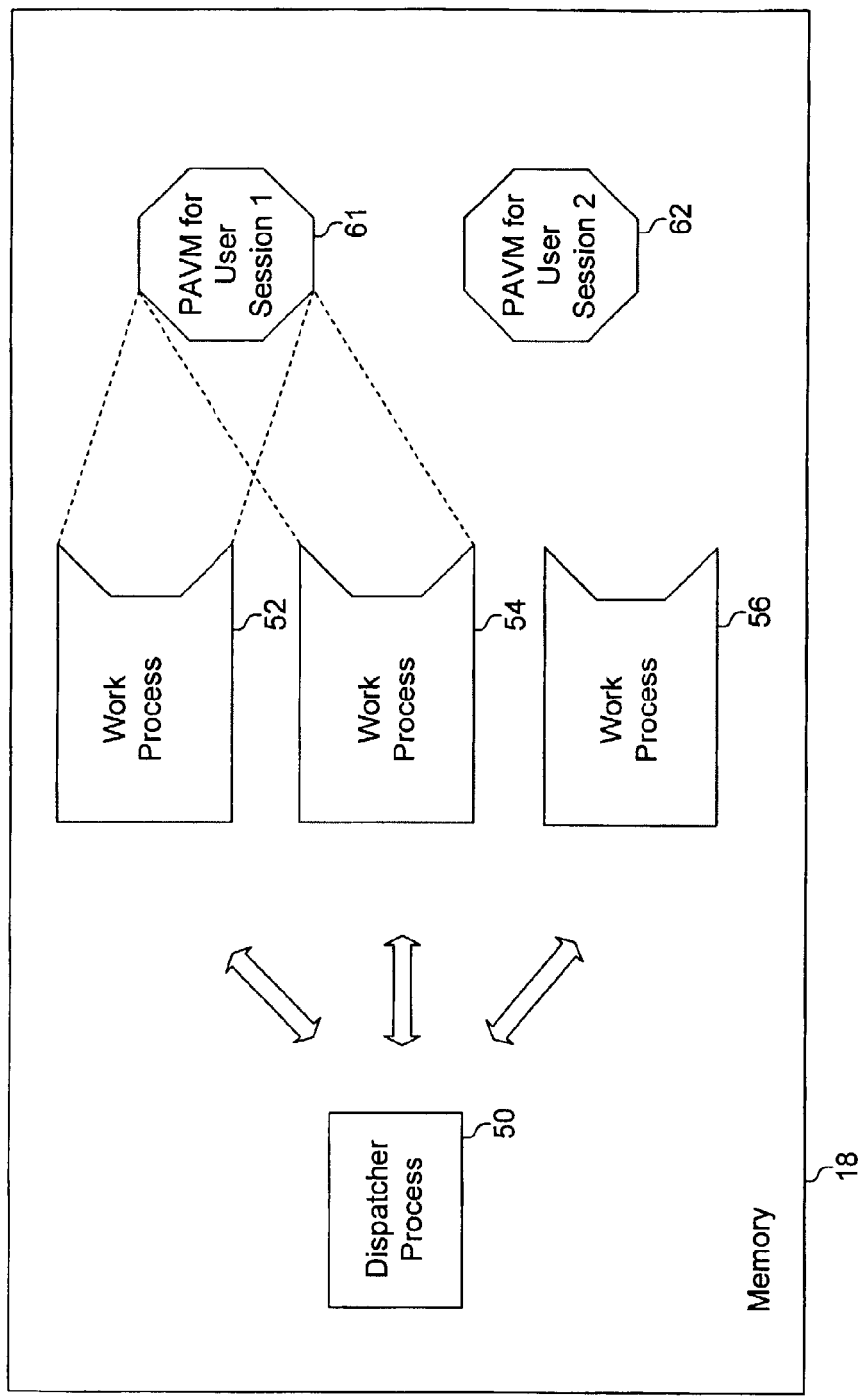
FIG. 2 is a block diagram of the server memory of FIG. 1.

Referring to FIG. 2, there are two user sessions: user session 1 and user session 2. Memory 18 of the server 12 thus contains two PAVMs 61, 62, which correspond to user sessions 1 and 2 respectively. Multiple operating system processes are allocated to the server 12. When the server 12 receives a request, a special process, the dispatcher process 50, dispatches the request to one of the other processes allocated to the server 12, such as work process 52, work process 54, or work process 56. Assuming that the request corresponds to user session 1, and that the dispatcher process 50 dispatches the request to work process 52, the server 12 attaches or binds PAVM 61 to work process 52 in order to process the request. After the request has been processed, the server can detach PAVM 61 from work process 52. Work process 52 can then be used to process another request. For example, if the server 12 receives a new request that corresponds to user session 2 and the dispatcher process 50 dispatches the request to work process 52, PAVM 62 can be attached to work process 52 to process the new request. Continuing with this example, if the server 12 receives another request corresponding to user session 1 while work process 52 is still being used to process the request corresponding to user session 2, the dispatcher process 50 can dispatch the new request from user session 1 to work process 54, and PAVM 61 can be attached to work process 54 in order to process the new request from user session 1.

The server 12 is not required to have a dispatcher process 50. For example, in an alternative implementation, user requests can be serially assigned to processes allocated to the server 12. Each process could maintain a queue of requests, and attach the PAVM of the user session corresponding to the request at a front of the queue in order to process that request.

In order to reduce synchronization overhead and the number of context switches, the number of operating system processes allocated to the server 12 should be roughly equal to the number of processors available on the computer on which the server 12 is running. However, the benefits of increased isolation and robustness can be achieved even when the server 12 uses only one operating system process to process user requests.

Figure 3:
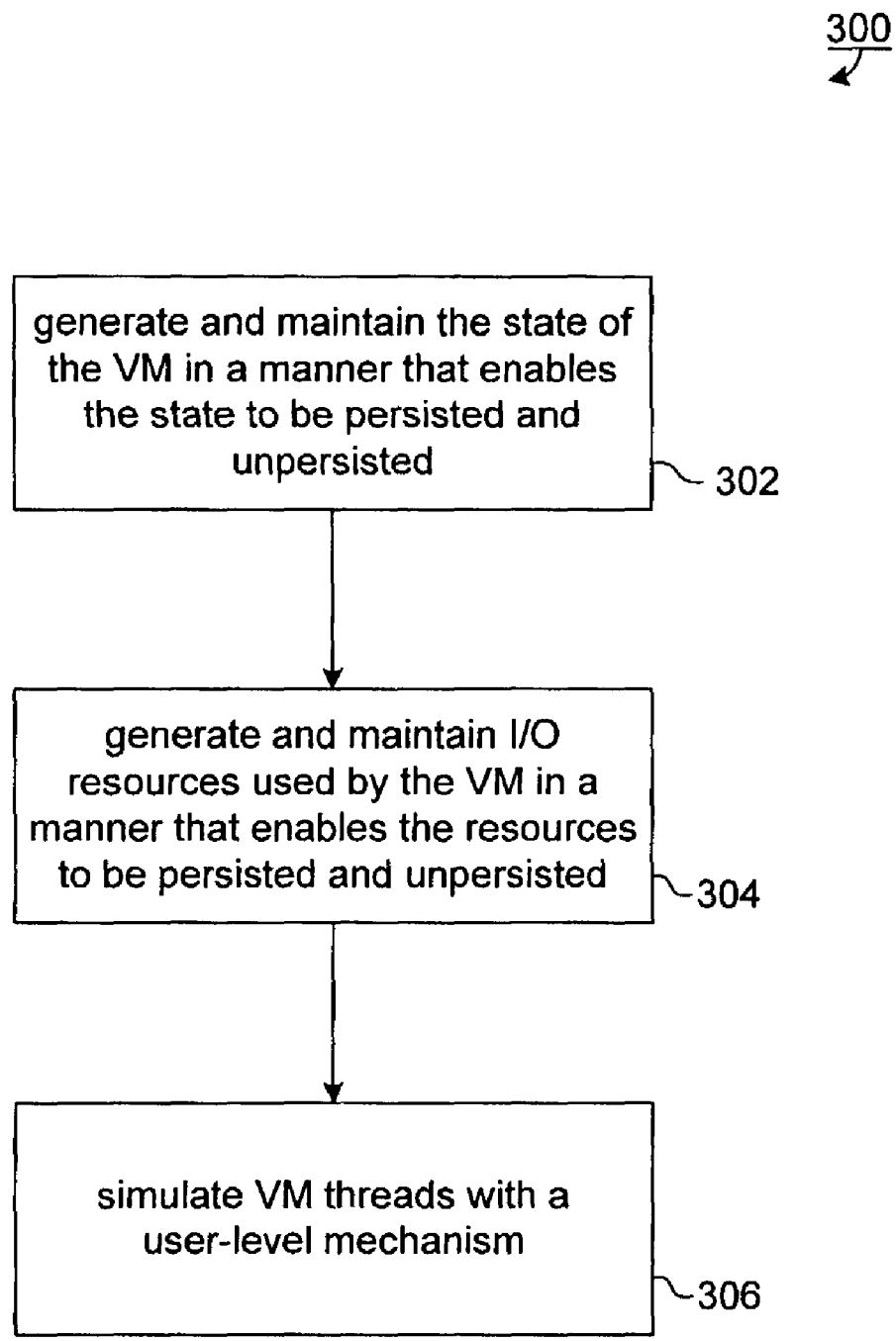
FIG. 3 is a block diagram of a process for converting a VM into a PAVM.

As mentioned above, a PAVM is a VM that can be attached to and detached from an OS process. Referring to FIG. 3, a process 300 can be used to convert a generic, typical VM into a PAVM. Alternatively, a PAVM can be developed from the ground up by building a VM with the characteristics described below.

In order to be able to detach a VM from a process (and to attach the VM to another process), the affinity between the VM and the process in which it runs needs to be removed. When a VM is detached from a process, the state of the VM needs to be persisted. When the VM is attached to another process, the state of the VM needs to be unpersisted. Thus, the state of the VM needs to be generated and maintained in a manner that enables the state to be persisted and unpersisted (302). Moreover, persisting the state of the VM when detaching the VM from a process, and unpersisting the state of the VM when attaching the VM to a different process, should be low cost operations. This can be achieved by storing the state of the VM in shared memory that is accessible to the OS processes allocated to the server.

In order to store the state of a VM in shared memory, a user context corresponding to a user session—including both a user heap and a user stack—need to be stored in shared memory. Storing the user heap in shared memory is straightforward, i.e., memory for the heap is allocated from a shared memory segment. Storing the user stack can be more difficult because in some instance, such as with Java VMs, the user stack and the VM stack are not separated. In such instances, a solution is to store a complete stack of the VM, including the user stack, in shared memory. This is accomplished by implementing the VM as an operating system co-routine.

Typical subroutines display a hierarchical relationship. For example, subroutine A suspends on invoking a subroutine B, which on termination returns control to subroutine A, which resumes from the point of suspension. Co-routines have a parallel rather than a hierarchical relationship. Thus, for example, co-routine A suspends on invoking co-routine B, but co-routine B also suspends on returning control to co-routine A. To co-routine B, this return of control appears to be an invocation of co-routine A. When co-routine A subsequently invokes co-routine B and suspends, co-routine B behaves as though its previous invocation of co-routine A has returned, and it resumes from the point of that invocation. Control thus bounces between the two co-routines, each one resuming where it left off.

Co-routines can be compared to threads, i.e., co-routines each have their own stack and share a heap. A difference between threads and co-routines is that whereas the operating system takes care of scheduling between threads, a programmer has to take care of scheduling between co-routines. Co-routines can be used to simulate threads, as explained below. For example, a set of functions within the Linux glibc library, including the setcontext(), getcontext(), makecontext(), and swapcontext() functions, can be used to start a new co-routine within a process, to switch between co-routines, and very importantly, to provide memory for the stack of a co-routine. This last feature enables the stack of the VM to be allocated from and stored in shared memory.

When a user session starts, a PAVM corresponding to the user session is generated and initialized. A private block of shared memory, called a "session memory," is allocated to the PAVM. The PAVM's heap and stacks are allocated directly from this private block of shared memory. Using shared memory to store the state of the PAVM makes a process of binding or attaching the PAVM to an OS process essentially a non-operation, i.e., the operating system process simply maps the PAVM's session memory into its address space. Similarly, the process of detaching the PAVM from the OS process simply requires unmapping the PAVM's session memory from the address space of the OS process. No data is actually moved or copied.

In order to be able to detach a VM from a process (and to attach the VM to another process), input/output (I/O) resources used by the VM, such as file handles and sockets, also need to be persisted. The I/O resources used by the VM need to be generated and maintained in a manner that enables the resources to be persisted and unpersisted (304). This can be accomplished by using an additional level of indirection to access I/O resources or proxies for such resources. For example, what a PAVM sees as a file or socket descriptor is actually just a handle to the file or socket. A handle can be persistable by itself, e.g., a file handle can be stored in the PAVM's session memory. Alternatively, a handle can be made persistable through the use of a resource manager, e.g., in the case of sockets, descriptor passing can be used to notify a socket manager about an I/O request for a specific socket; a socket manager can then notify the dispatcher when the I/O request is completed.

Some VMs may be multi-threaded. A thread is essentially placeholder information that enables a program to handle multiple concurrent users or service requests within a single use of the program. From the program's point-of-view, a thread is the information needed to serve one individual user or a particular service request. If multiple users are using the program concurrently or if the program receives concurrent requests, a thread is created and maintained for each such user or request. The thread allows the program to know which user or request is being served as the program alternatively gets re-entered on behalf of different users or requests.

Native OS threads cannot easily be persisted to shared memory. Thus, in order to be able to detach a multi-threaded VM from a process (and to attach the VM to another process), native threads are simulated by a user-level mechanism (306). Employing a user-level mechanism to simulate native threads is sometimes referred to as providing "green thread" functionality. Green threads are user-level threads that are scheduled by the user rather than by the operating system.

One mechanism that can be used to simulate native threads is operating system co-routines. As explained above, co-routines are similar to threads, except that the programmer (rather than the operating system) takes care of scheduling between co-routines. Native threads that are used to implement VM threads can thus be mapped to co-routines. All data structures related to thread management and scheduling, including the threads' call stacks, mutexes, and condition variables for Java monitors, are kept in a PAVM's session memory. In the example of a Java PAVM, that includes both the Java stacks and the C stacks used by the VM implementation, e.g. for the Java Native Interface (JNI) implementation of dynamic method invocation.

Operating systems typically schedule threads preemptively in order to maximize fairness (i.e., in order to give each thread a chance to run at some point). In contrast, co-routine scheduling, which is handled by the programmer, is not preemptive. That is not necessarily a drawback, however, for in the context of servers, request throughput is often more important than fairness. Request throughput, which is a main objective for scalability, can be maximized by using a batch processing strategy to schedule co-routines. In a batch processing strategy, within each PAVM, each co-routine yields cooperatively to a scheduler (sometimes still referred to as a thread scheduler) when entering a wait state (i.e., when blocking on I/O or on a monitor such as a Java monitor). Coordination between blocking I/O calls and the thread scheduler is part of the I/O redirection mechanism described above. Mutexes and condition variables are implemented without using operating system locking primitives as scheduler-controlled variables in session memory.

Co-routine scheduling can continue for a PAVM until all its co-routines have entered a wait state, indicating that the user request is either completed or waiting for I/O. In either case, the PAVM can be detached from the work process. The dispatcher process 50 can reattach the PAVM to some work process when the next request comes from the user session, or when the I/O request is completed.

Whereas native threads that are used to implement VM threads can be mapped to co-routines, native threads that are only used internally inside the VM, e.g., for garbage collection, can be replaced with synchronous function calls. This can be thought of as a way of simulating the internal native thread. Alternatively, if a function to be performed by the internal native thread is to be executed asynchronously, the function could be scheduled and performed on a designated low priority process within the server. Yet another alternative is to omit some functions altogether. For example, it may be possible to simply release all of the session memory upon the termination of a user session rather than perform garbage collection while the user session is active.

Figure 4:
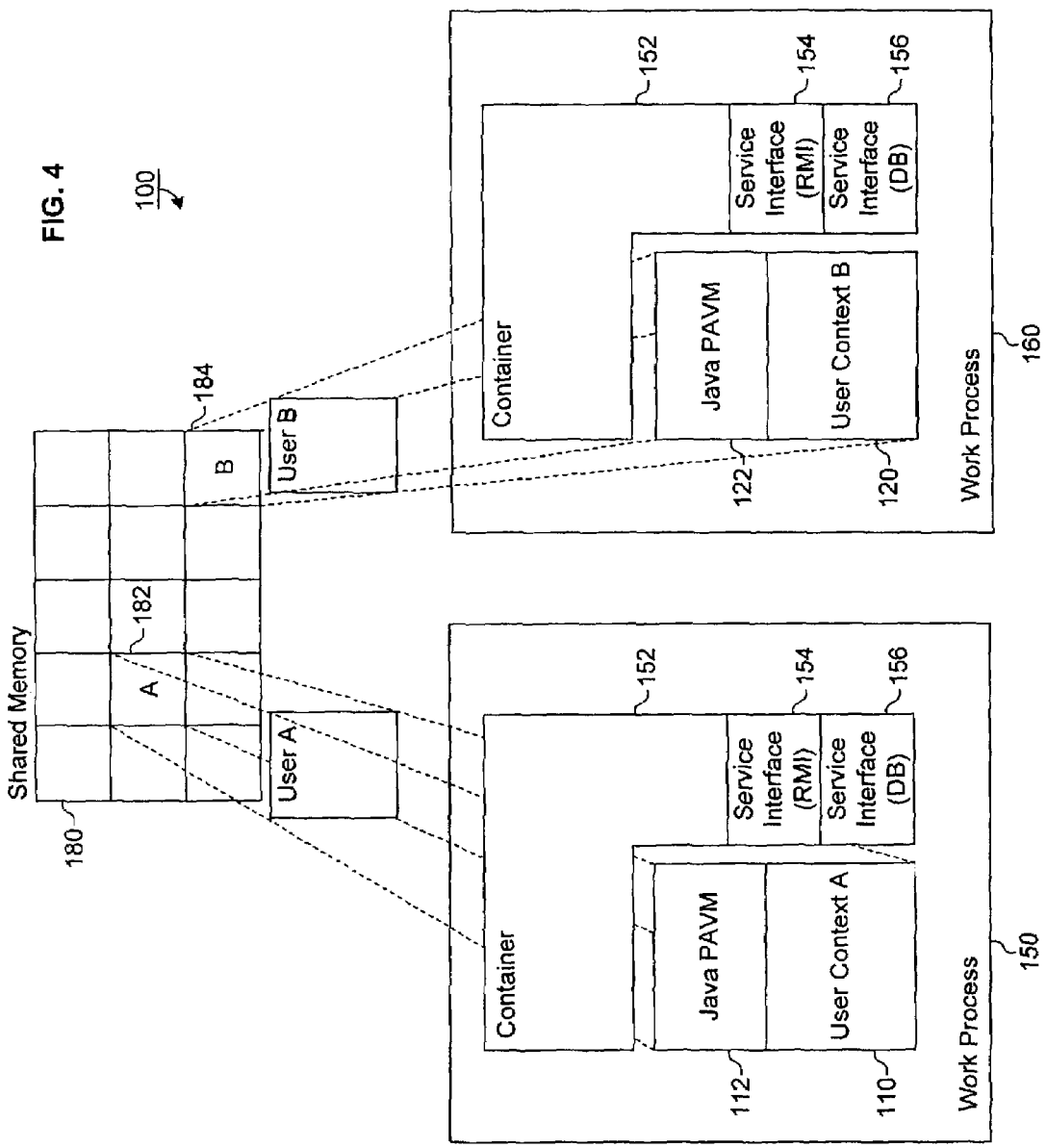
FIG. 4 is a block diagram of a J2EE server.

Referring to FIG. 4, an example Java 2 Platform, Enterprise Edition (J2EE) application server 100 includes a shared memory 180 and work processes 150, 160. J2EE is a Java platform designed for the mainframe-scale computing that is typical of large enterprises. J2EE simplifies application development in a tiered, thin client environment by generating standardized, reusable modular components and enabling tiers to handle many aspects of programming automatically. J2EE includes many components of Java 2 Platform, Standard Edition (J2SE), such as a Java 2 Development Kit (JDK), support for Common Object Request Broker Architecture (COBRA), Java Database Connectivity 2.0 (JDBC), and a security model. J2EE also includes support for Enterprise JavaBeans (EJB), a Java servlet application programming interface (API), and Java Server Pages (JSP).

Each work process 150, 160 can include a container 152 and service interfaces such as Remote Method Invocation (RMI) 154 and a database management system (DB) 156. RMI is an object-oriented programming technique that enables objects on different computers to interact over a distributed network. RMI is the Java version of what is generally known as a remote procedure call (RPC), but with the added ability to pass one or more objects along with a request.

The container 152 can include an OS interface that provides a more well-suited framework for a server architecture than the framework provided by the native OS. The OS interface can take over responsibility for certain functions from the native OS, such as scheduling, memory management, process architecture, clustering, load balancing, and networking. By taking over such functions, the container can control use of critical resources such as processors and memory in a manner that optimizes certain objectives such as request throughput. The container 152 can also serve to hide the details of a server's native operating system from the applications executing on the server.

In addition, the container 152 serves as an interface through which a PAVM is attached to a process, executed in the process, and detached from the process. Thus, the container 152 provides some of the functionality required for the use of PAVMs, such as persisting and unpersisting the state of a PAVM (e.g., by mapping the shared memory block allocated to the PAVM into the address space of the process), and scheduling of the PAVM's threads or co-routines.

In the example in FIG. 4, a user session A is mapped to work process 150. User session A includes a user context A 110 and a PAVM 112. A block 182 of shared memory 180 is allocated for user session A. The user context A 110 and the state of PAVM 112 are stored in shared memory block 182. In the example, user session A generated a request, which is dispatched to work process 150. In order to process this request, the PAVM 112 is bound to work process 150. Thus, user context A 110 and the state of the PAVM 112 have been mapped into the address space of the work process 150. The PAVM 112 is then executed by the work process 150 in order to process the request. When the request has been processed, the PAVM 112 can be detached from the work process 150. Thus, the user context A 110 and the state of the PAVM 112 are unmapped from the address space of the work process 150.

FIG. 4 also shows a user session B mapped to work process 160. User session B includes a user context B 120 and a PAVM 122. A block 184 of shared memory 180 is allocated for user session B. The user context B 120 and the state of PAVM 122 are stored in shared memory block 184, which is mapped into the address space of the work process 160. When the request from user session B has been processed, the PAVM 122 is detached from the work process 150. Thus, the user context B 120 and the state of the PAVM 112 are unmapped from the address space of the work process 150.

If a new request arrives from user session A, the new request can be dispatched, for example, to work process 160, assuming that the PAVM 122 has been detached from work process 160, either because the PAVM 122 is in a wait state or because the PAVM 122 has finished processing the request from user session B. The PAVM 112 and the user context A 110 corresponding to user session A are then bound to work process 160. This does not require the moving or copying of any data—rather, shared memory block 182 is simply mapped into the address space of the work process 160. The work process 160 can then execute the PAVM 112 to process the new request from user session A.

Users sessions can thus be mapped to and can move between different processes. In this way, requests can be processed as soon as a processor is available. Moreover, mapping user sessions to different processes is a very inexpensive operation. As a result, request throughput is optimized. The use of PAVMs also results in a scalable server, as request throughput can be further optimized by allocating more processes to the server. It is also possible to add more processors to the underlying computer in order to better handle the increased number of processes.

The use of PAVMs also makes the server robust. This is due to the isolation the OS provides between work processes. Moreover, it is also possible to protect the memory and states associated with user sessions by mapping only one user session's memory and PAVM into a work process at a time.

In an alternative implementation, two or more PAVMs are attached to and executed within one process. For example, an Advanced Business Application Programming language (ABAP) VM and a Java VM can be executed in one process. ABAP is a programming language for developing applications for the SAP R/3 system, a widely installed business application system developed by SAP AG of Germany. Running an ABAP VM and a Java VM in one process enables the use of both ABAP and Java components in the same application. Applications can be developed to take advantage of useful components either from ABAP or from Java. The techniques described below can be used to execute multiple VMs within one process. For example, a process can be used to execute a Java VM, and ABAP VM, and a Microsoft VM.

Executing multiple VMs within one process is accomplished through the use of co-routines. In the example where an ABAP VM and a Java VM are to run within one process, two co-routines can be used—one for the ABAP VM and one for the Java VM. In addition to either the Java VM or the ABAP VM, each co-routine can also include either a container or a portion of a container in order to handle such functions as scheduling and communication between the two VMs, as well as with applications outside the server.

Continuing with the ABAP/Java example, if the ABAP VM is the primary VM that an application will use, the co-routine that executes the ABAP VM will include a container as described above. The first time a request executing within the ABAP VM calls a Java object, the container allocates memory for the Java VM stack (including the Java user stack), and starts a new co-routine to execute the Java VM. The parameters passed to the new co-routine include the location and size of the memory that is allocated, as well as a start function for the new co-routine (in this case, the Java VM itself). The Java VM then starts a main class, i.e., an implementation of a J2EE container that can be used to run J2EE components, such as Java servlets, Enterprise Java Beans (EJBs), or Java Server Pages (JSPs). While it is executing, the Java VM can invoke container functionality to, for example, read requests from and write responses to a message area. For scheduling, the Java VM can return control to the ABAP VM after it has written either a response or a request. The Java VM can then be re-scheduled upon the arrival of either a new request or a response to its own request.

Figure 5:
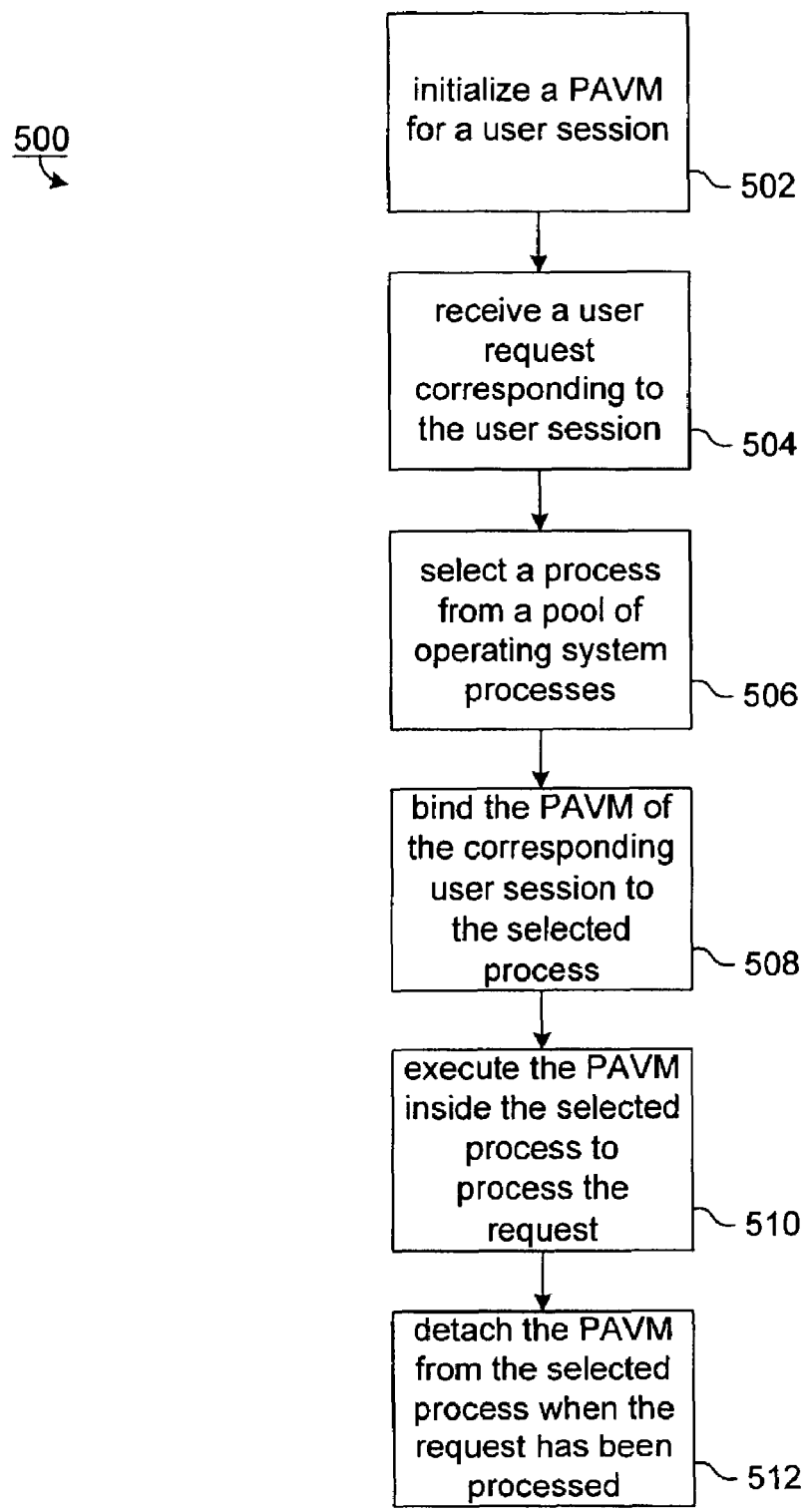
FIG. 5 is a block diagram of a process for using a PAVM.

Referring to FIG. 5, the process 500 provides isolation between user sessions in a scalable manner through the use of PAVMs. When a user session starts, a PAVM is generated and initialized for that user session (502). That can include allocating a block of memory for the PAVM. Although the memory can be shared memory, meaning that it can be accessed by the processes allocated to the server, the allocated block of memory can be designated as private, meaning that that block of memory will belong solely to the newly created PAVM.

After a block of memory has been allocated to the PAVM, the PAVM can be stored in the memory block. The computational state of the PAVM (including the PAVM stack and heap), and the user context for the corresponding user session (including both the user stack and heap) can all be stored in the memory block. The user context can include a handle to an I/O resource such as a file, or a handle to a proxy (e.g., a resource manager) for an I/O resource such as a socket.

Initializing a PAVM can be an expensive operation, as it may involve loading, verifying, and resolving several classes (e.g., Java system classes), as well as executing numerous static initializers in system classes. The initialization overhead can be reduced through the use of a pre-initialized "master" PAVM. Rather than initializing a new PAVM from scratch, the memory block of the master PAVM can simply be copied into the memory block of the new PAVM. Copying the template image of the master PAVM's memory block into the memory block of a new PAVM enables the new PAVM to start running in an already-initialized state.

Initialization (as well as execution) overhead can be further reduced through another optimization: storing type information (i.e., the runtime representation of loaded classes) in a section of shared memory that can be accessed by all the PAVMs. This technique can reduce the overhead for class loading, verification, and resolution incurred by each PAVM, and can be especially useful if used to share the byte code of system classes that are likely to be used by every user context. Similar techniques can be used to share the byte code of user classes.

After a PAVM has been initialized, the PAVM can be used to process user requests from the corresponding user session. When a user request from the corresponding user session is received (504), an available process from the pool of OS processes allocated to the server can be selected to process the request (506). The PAVM of the user session that sent the request is then bound to the selected process (508).

If the memory block used to store the PAVM is shared memory that is available to all the processes of the server, binding is essentially a non-operation, i.e., the memory block, or a portion thereof, simply is mapped into the address space of the selected process. The mapped portion can include the computational state of the PAVM. Alternatively, the PAVM can be unpersisted in a different manner. For example, the computational state of the PAVM can be copied from a file. The performance of such an operation can be bad, however, especially in comparison to the efficient operation of mapping shared memory into a process address space, which does not require copying or moving of data.

After the PAVM has been bound to the selected process, the PAVM can then be executed by the process in order to process the user request (510). This can involve the execution of two or more co-routines to simulate threads within the PAVM. It can also involve the execution of a synchronous function call to simulate the execution of an internal thread (e.g., a thread for performing garbage collection). If the internal thread or another function is performed asynchronously, one of the processes allocated to the server can be designated as a low priority process and used to perform the function for the PAVM. This technique can be used to perform garbage collection in a PAVM, for example. For a more important function, the PAVM could be scheduled to run on either a normal or a high priority processor in order to perform the function.

After the PAVM has processed the user request, the PAVM is detached from the selected process (512). The selected process can then be returned to the pool of available processes so that it can be used to process new requests received by the server. As with binding, detaching a PAVM from a process can be a simple, low cost operation: the PAVM's block of shared memory may simply be unmapped from the process address space. Alternatively, persisting the PAVM may involve a more complicated or expensive operation, such as saving the computational state of the PAVM to a file. In essence, binding a PAVM to a process and detaching the PAVM from the process are mirror images of each other, i.e., the operation that was performed to unpersist the PAVM must be reversed in order to persist the PAVM.

When a user session terminates, the PAVM can also be terminated, and all of its resources, including its allocated memory, can be released. Since the PAVM's memory is released at the end of the user session, it may be possible to omit garbage collection during the life of the PAVM. An alternative to terminating the PAVM at the end of a user session is to reuse the PAVM, i.e., to associate the PAVM with a different user session and to use the PAVM to process the requests corresponding to that user session. This technique can be especially useful for applications that require a very small user context, or even no user context, to be kept (applications in the latter category are referred to as stateless applications), as well as application that have very short user sessions. For all such applications, using a pool of serially reusable PAVMs can help to minimize the overhead associated with creating, initializing, maintaining, and terminating PAVMs.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   generating a virtual machine capable of being attached to a user session, initializing the virtual machine for the user session;
   storing a state of the virtual machine at a shared memory associated with the virtual machine;
   receiving a request corresponding to the user session;

maintaining a request queue having the request, and bringing the request to a front of the request queue;

prioritizing a plurality of operating system processes as low priority operating system processes and high priority operating system processes;

selecting a high priority operating system process from the plurality of operating system processes;

binding the virtual machine to the selected high priority operating system process to process the request, wherein the binding of the virtual machine includes mapping a portion of the shared memory to a corresponding address space of the selected high priority operating system process;

detaching the virtual machine from the selected high priority operating system process upon completion of the processing of the request, the virtual machine including a process attachable virtual machine; and selecting a low priority operating system process from the plurality of operating system processes to facilitate an asynchronous function relating to the virtual machine, the asynchronous function including garbage collection.

2. The method of claim 1, wherein initializing comprises storing the virtual machine in a memory area of the shared memory, the virtual machine including one or more of a Java virtual machine and an Advanced Business Application Programming (ABAP) virtual machine.

3. The method of claim 2, wherein initializing further comprises copying a template image into the memory area.

4. The method of claim 1, wherein the mapped portion of the shared memory area comprises the computational state of the virtual machine.

5. The method of claim 2, wherein storing comprises maintaining a computational state of the virtual machine in the memory area.

6. The method of claim 5, wherein the computational state of the virtual machine comprises a heap and a stank for the virtual machine.

7. The method of claim 2, wherein storing comprises maintaining a user context corresponding to the user session in the memory area.

8. The method of claim 7, wherein the user context comprises one or more of a user heap and a user stack.

9. The method of claim 7, wherein the user context comprises a handle to an input/output (I/O) resource.

10. The method of claim 1, further comprising isolating the plurality of operating system processes from other processes.

11. An article of manufacture comprising a machine-readable medium storing instructions which, when executed, cause a machine to:

generate a virtual machine capable of being attached to a user session, initialize the virtual machine for a user session;

store a state of the virtual machine at a shared memory associated with the virtual machine;

receive a request corresponding to the user session;

maintain a request queue having the request, and bring the request to a front of the request queue;

prioritize a plurality of operating system processes as low priority operating system processes and high priority operating system processes;

select a high priority operating system process from the plurality of operating system processes;

bind the virtual machine to the selected high priority operating system process to process the request, wherein the binding of the virtual machine includes mapping a portion of the session memory to a corresponding address space of the selected high priority operating system process;

detach the virtual machine from the selected high priority operating system process upon completion of the processing of the request, the virtual machine including a process attachable virtual machine; and select a low priority operating system process from the plurality of operating system processes to facilitate an asynchronous function relating to the virtual machine, the asynchronous function including garbage collection.

12. The article of manufacture of claim 11, wherein the instructions when executed to initialize further cause the machine to store the virtual machine in a memory area of the shared memory.

13. A system comprising:

a client to execute an application constituting a user session; and a server coupled to the client, the server to:

generate a virtual machine capable of being attached to a user session, and initialize the virtual machine for the user session;

store a state of the virtual machine at a shared memory associated with the virtual machine;

receive a request corresponding to the user session;

maintain a request queue having the request, and bring the request to a front of the request queue;

prioritize a plurality of operating system processes as low priority operating system processes and high priority operating system processes;

select a high priority operating system process from the plurality of operating system processes;

bind the virtual machine to the selected high priority operating system process to process the request, wherein the binding of the virtual machine includes mapping a portion of the session memory to a corresponding address space of the selected high priority operating system process;

detach the virtual machine from the selected high priority operating system process upon completion of the processing of the request, the virtual machine including a process attachable virtual machine; and select a low priority operating system process the plurality of operating system processes to facilitate an asynchronous function relating to the virtual machine, the asynchronous function including garbage collection.

14. The system of claim 13, wherein the virtual machine is stored in a memory area of the shared memory at the server.

15. The system of claim 13, wherein the server comprises a Java 2 Platform, Enterprise Edition (J2EE) application server.

16. The system of claim 13, wherein the virtual machine comprises on or more of a Java virtual machine and an Advanced Business Application Programming (ABAP) virtual machine.

* * * * *